(12) United States Patent
Kondo et al.

(10) Patent No.: US 12,319,181 B2
(45) Date of Patent: Jun. 3, 2025

(54) CUSHION FRAME

(71) Applicant: TOYOTA BOSHOKU KABUSHIKI KAISHA, Aichi (JP)

(72) Inventors: Yuma Kondo, Aichi (JP); Takuya Inoue, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 149 days.

(21) Appl. No.: 18/123,627

(22) Filed: Mar. 20, 2023

(65) Prior Publication Data

US 2023/0311730 A1 Oct. 5, 2023

(30) Foreign Application Priority Data

Apr. 4, 2022 (JP) .................................. 2022-062587

(51) Int. Cl.
*B60N 2/68* (2006.01)
*B60N 2/427* (2006.01)

(52) U.S. Cl.
CPC ......... *B60N 2/682* (2013.01); *B60N 2/42709* (2013.01); *B60N 2/686* (2013.01)

(58) Field of Classification Search
CPC .... B60N 2/42709; B60N 2/1615; B60N 2/68; B60N 2/16
See application file for complete search history.

(56) References Cited

U.S. PATENT DOCUMENTS

| 6,176,543 | B1 * | 1/2001 | Nawata | B60N 2/4228 296/68.1 |
| 8,684,462 | B2 * | 4/2014 | Brewer | B60N 2/06 297/344.17 |
| 9,352,666 | B2 * | 5/2016 | Kaku | B60N 2/4228 |
| 9,744,884 | B2 * | 8/2017 | Hoshi | B60N 2/68 |
| 9,758,065 | B2 * | 9/2017 | Kimura | B60N 2/12 |
| 11,332,048 | B2 * | 5/2022 | Inose | B60N 2/22 |
| 2012/0217775 | A1 * | 8/2012 | Fujita | B60N 2/4228 297/216.13 |
| 2015/0202998 | A1 * | 7/2015 | Komatsubara | B60N 2/42709 297/216.1 |
| 2015/0210188 | A1 * | 7/2015 | Hoshi | B60N 2/7094 297/344.12 |

(Continued)

FOREIGN PATENT DOCUMENTS

| CN | 111204267 | A | * | 5/2020 | |
| DE | 19928813 | C1 | * | 12/2000 | ............... B60N 2/16 |

(Continued)

*Primary Examiner* — Timothy J Brindley
(74) *Attorney, Agent, or Firm* — Greenblum & Bernstein, P.L.C.

(57) ABSTRACT

A cushion frame comprises first and second side frames and a coupling member coupling rear end portions of the first and second side frames. Each of the first and second side frames has a fixation portion at a corresponding rear end portion. The first side frame comprises first and second bead portions in the rear end portion thereof. In the first side frame, a hypothetical ridge line of the first bead portion substantially coincides with an imaginary line extending from the coupling member to the fixation portion. An angle between the hypothetical ridge line of the first bead portion and a hypothetical ridge line of the second bead portion is equal to or less than a preset angle.

6 Claims, 9 Drawing Sheets

(56) References Cited

U.S. PATENT DOCUMENTS

| | | | | |
|---|---|---|---|---|
| 2015/0352981 A1* | 12/2015 | Nagayasu | ................ | B60N 2/68 |
| | | | | 297/313 |
| 2016/0280101 A1* | 9/2016 | Kramer | .............. | B60N 2/42709 |
| 2021/0387552 A1* | 12/2021 | Ohashi | ................ | B60N 2/42709 |
| 2021/0402901 A1* | 12/2021 | Denis | ................ | B60N 2/42745 |
| 2024/0067058 A1* | 2/2024 | Mathew | ............... | B60N 2/1615 |
| 2024/0116401 A1* | 4/2024 | Susko | ................ | B60N 2/1842 |

FOREIGN PATENT DOCUMENTS

| | | | | | |
|---|---|---|---|---|---|
| DE | 102014202086 B3 | * | 2/2015 | ........... | B60N 2/1615 |
| DE | 102015103366 A1 | * | 9/2016 | | |
| JP | 2008284945 A | * | 11/2008 | ........... | B60N 2/1615 |
| JP | 2009166658 A | * | 7/2009 | ........... | B60N 2/4228 |
| JP | 2013-132917 | | 7/2013 | | |
| KR | 20090025600 A | * | 3/2009 | | |
| KR | 101683397 B1 | * | 12/2016 | | |
| WO | WO-2006093644 A1 | * | 9/2006 | ......... | B60N 2/42709 |
| WO | WO-2010144084 A1 | * | 12/2010 | ......... | B60N 2/0232 |
| WO | WO-2012135347 A1 | * | 10/2012 | ......... | B60N 2/1615 |

\* cited by examiner

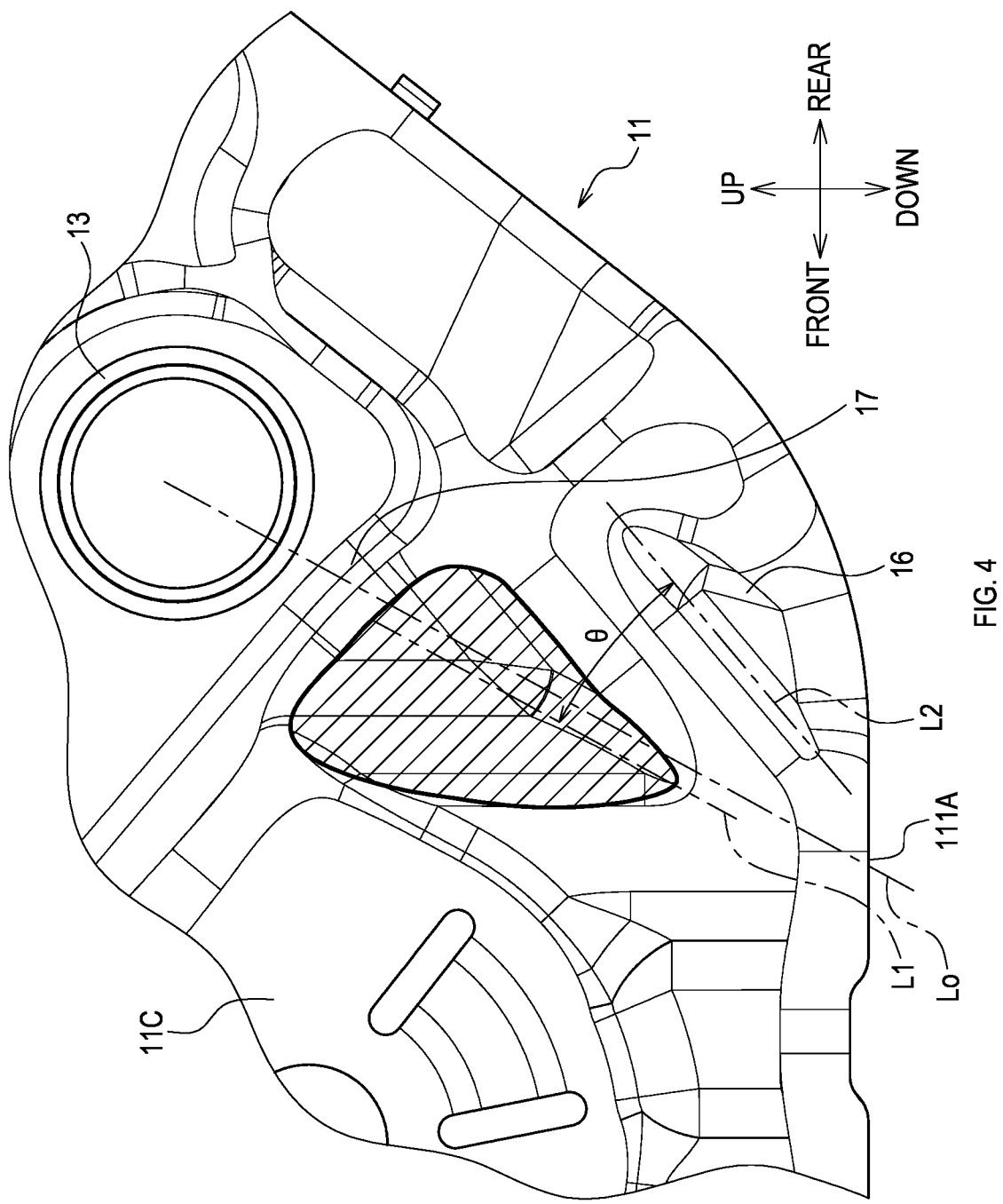

CUSHION FRAME

CROSS-REFERENCE TO RELATED APPLICATIONS

This application claims the benefit of Japanese Patent Application No. 2022-062587 filed on Apr. 4, 2022 with the Japan Patent Office, the entire disclosure of which is incorporated herein by reference.

BACKGROUND

The present disclosure relates to a cushion frame constituting a framework of a seat cushion.

For example, a side frame disclosed in Japanese Unexamined Patent Application Publication No. 2013-132917 (hereinafter, referred to as "Patent Document 1") comprises an energy-absorbing portion configured as a recess portion recessed in a seat-width direction. When a large load is applied to the side frame, the energy-absorbing portion of the side frame intensively deforms to thereby absorb the energy from the load.

SUMMARY

For example, when a cushion frame comprising two side frames and a coupling pipe coupling the two side frames receives a large downward load input to the coupling pipe, general surfaces of the two side frames may be deformed so as to bulge in a seat-width direction.

The present disclosure discloses one example of a cushion frame capable of inhibiting deformation, such as the above described deformation.

It is desirable that a cushion frame constituting a framework of a seat cushion of a vehicle seat according to one aspect of the present disclosure comprises, for example, at least one of following constituent requirements.

That is, the constituent requirements are a first side frame that is arranged on one end side in a seat-width direction and that extends in seat front-rear directions, the first side frame comprising a fixation portion in a rear end portion thereof, the fixation portion being directly or indirectly fixable to a vehicle; a second side frame that is arranged on the other end side in the seat-width direction and that extends in the seat front-rear directions, the second side frame comprising a fixation portion in a rear end portion thereof, the fixation portion being directly or indirectly fixable to the vehicle; a coupling member extending in the seat-width direction and coupling the rear end portion of the first side frame and the rear end portion of the second side frame; and a first bead portion and a second bead portion provided in the rear end portion of at least the first side frame and curved such that a part of the first side frame bulges or is recessed in the seat-width direction.

It is desirable that, in the first side frame, a hypothetical ridge line defined by joining tops of the first bead portion substantially coincides with an imaginary line extending from the coupling member to the fixation portion of the first side frame, the second bead portion is positioned below the first bead portion, and an angle between a hypothetical ridge line defined by joining tops of the second bead portion and the hypothetical ridge line of the first bead portion is equal to or less than a preset angle.

Accordingly, even if a large downward load is applied to the coupling member, the first bead portion and the second bead portion inhibit the first side frame from being deformed so as to bulge in the seat-width direction. Furthermore, this enables reduction of a thickness of a member constituting the first side frame. As a result, it is possible to reduce a weight of the first side frame.

The cushion frame may have, for example, following configurations.

That is, it is desirable that a fragile portion bent into a stepped shape is provided in the first side frame between the coupling member and the first bead portion.

Accordingly, if a large downward load is applied to the coupling member, the fragile portion can be plastically deformed so as to cause buckling, thus guiding the coupling member to be displaced along the hypothetical ridge line of the first bead portion of the first side frame.

Furthermore, even in a case where the large downward load is applied to the coupling member to thereby greatly displace the coupling member, it is possible to inhibit the coupling member from interfering with a member other than the first side frame.

In addition, in the first side frame, when a dimension of a portion of the first bead portion parallel to a direction that is orthogonal to the hypothetical ridge line of the first bead portion and the seat-width direction is defined as a bead width, it is desirable that the bead width decreases toward the fixation portion of the first side frame.

BRIEF DESCRIPTION OF THE DRAWINGS

Example embodiments of the present disclosure will be described hereinafter by way of example with reference to the accompanying drawings, in which:

FIG. 4 is a diagram showing the rear end portion of the first side frame according to the first embodiment;

DETAILED DESCRIPTION OF EXEMPLARY EMBODIMENTS

Figure 1:
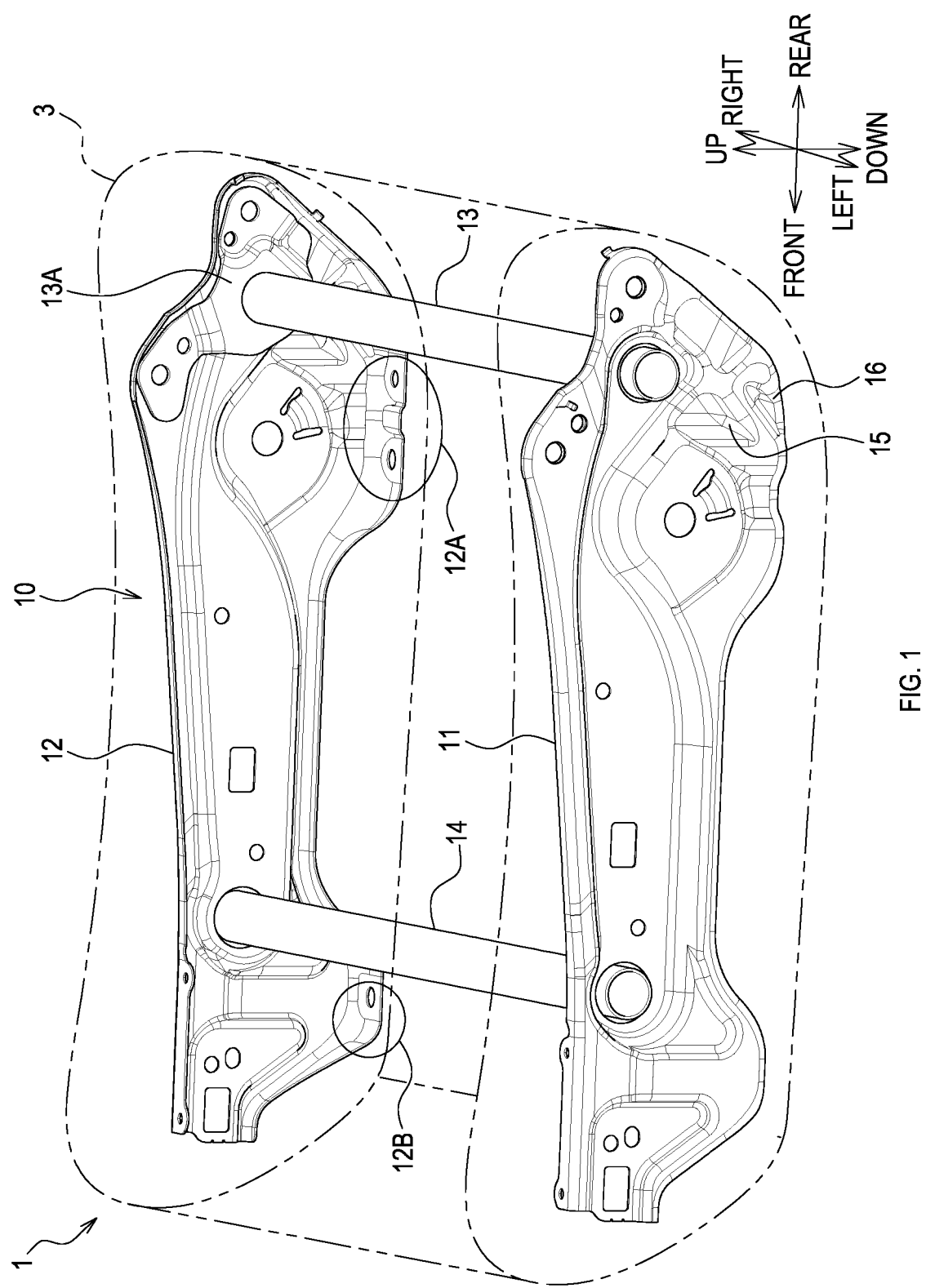
FIG. 1 is a diagram showing a cushion frame according to a first embodiment.

Embodiments described below are example embodiments falling within the technical scope of the present disclosure. In other words, invention-specifying matters and so on recited in the appended claims are not limited by specific configurations, structures, and so on indicated in the below-described embodiments.

The present embodiment is an example in which a cushion frame according to the present disclosure is applied to a seat to be installed in a vehicle, such as an automobile (hereinafter, referred to as a "vehicle seat"). Arrows indicating directions and diagonal lines shown in the drawings are provided for the purpose of easier understanding of mutual relationships between the drawings, shapes of members or portions and the like.

Thus, the cushion frame is not limited by the directions shown in the drawings. The directions shown in the drawings are based on a state where the vehicle seat according to the present embodiment is mounted on an automobile. The drawings with diagonal lines provided thereon are not necessarily cross-sectional views.

At least a member or a portion described with a reference numeral assigned thereto is at least one in number unless accompanied by a specifying wording, such as "only one". That is, the member or the portion may be two or more in number if no specifying wording, such as "only one", is present.

First Embodiment

<1. Overview of Cushion Frame>

A cushion frame 10 represented by solid lines in FIG. 1 is applied to a vehicle seat 1. The vehicle seat 1 comprises at least a seat cushion 3, a seatback (not shown), and other components.

The seat cushion 3 supports buttocks of an occupant. The seatback supports a back of the occupant. The cushion frame 10 is a strength member constituting a framework of the seat cushion 3.

<1.1. Schematic Configuration of Cushion Frame>

As shown in FIG. 1, the cushion frame 10 comprises at least a first side frame 11, a second side frame 12, a first coupling member 13, a second coupling member 14, and the like.

<First Side Frame>

Figure 2:
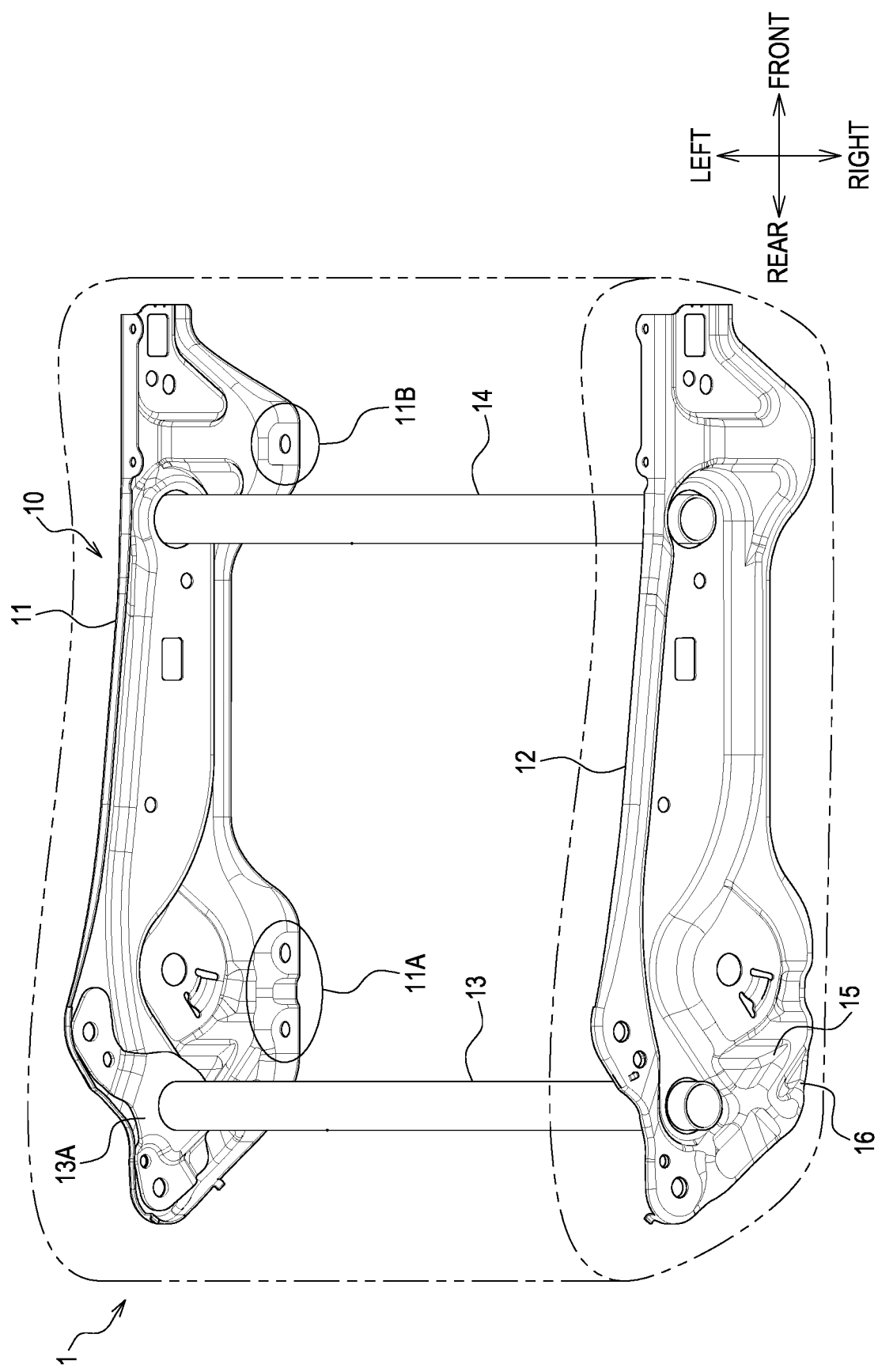
FIG. 2 is a diagram showing the cushion frame according to the first embodiment.

As shown in FIG. 2, the first side frame 11 is arranged on one end side in a seat-width direction (on a left side in the present embodiment), and extends in seat front-rear directions. Fixation portions 11A, 11B are provided in a lower end portion of the first side frame 11.

The fixation portion 11A is arranged in a rear end portion of the first side frame 11, and directly or indirectly fixed to a vehicle. The fixation portion 11B is arranged in a front end portion of the first side frame 11, and directly or indirectly fixed to the vehicle.

The first side frame 11 in the present embodiment, that is, the cushion frame 10, is indirectly fixed to the vehicle through a sliding device (not shown). The sliding device can fix the cushion frame 10 to the vehicle, for example, in a slidable or non-slidable manner in vehicle front-rear directions.

Each of the fixation portions 11A, 11B in the present embodiment comprises at least one bolt insertion hole. The bolt insertion hole is a through hole into which a fastening bolt (not shown) is inserted.

The fixation portion 11A in the present embodiment comprises two bolt insertion holes, one of which is arranged on a rear side, and hereinafter also referred to as a "rear bolt insertion hole 111A".

<Second Side Frame>

As shown in FIG. 1, the second side frame 12 is arranged on the other end side in the seat-width direction (on a right side in the present embodiment), and extends in the seat front-rear directions. Fixation portions 12A, 12B are provided in a lower end portion of the second side frame 12.

The fixation portion 12A is arranged in a rear end portion of the second side frame 12, and directly or indirectly fixed to the vehicle. The fixation portion 12B is arranged in a front end portion of the second side frame 12, and directly or indirectly fixed to the vehicle.

Like the first side frame 11, the second side frame 12 is indirectly fixed to the vehicle through a sliding device. Each of the fixation portions 12A, 12B in the present embodiment comprises at least one bolt insertion hole. The bolt insertion hole is a through hole into which a fastening bolt (not shown) is inserted.

In the present embodiment, the first side frame 11 and the second side frame 12 are substantially symmetrical about a center in the seat-width direction. In other words, the first side frame 11 and the second side frame 12 are configured to be substantially plane-symmetrical about a hypothetical vertical plane passing through the center in the seat-width direction.

The first side frame 11 and the second side frame 12 are each formed integrally with a first bead portion 15, a second bead portion 16 (described below), and the like by plastic working (for example, press working) on a metal plate, such as a cold-worked steel plate.

<First Coupling Member and Second Coupling Member>

The first coupling member 13 and the second coupling member 14 each extend in the seat-width direction. Each of the first coupling member 13 and the second coupling member 14 in the present embodiment is formed of a tubular hollow member (for example, a round pipe).

The first coupling member 13 couples the rear end portion of the first side frame 11 and the rear end portion of the second side frame 12. The second coupling member 14 couples the front end portion of the first side frame 11 and the front end portion of the second side frame 12.

The first coupling member 13 is fixed to each of the first side frame 11 and the second side frame 12 via a bracket 13A by welding. The second coupling member 14 is directly fixed to each of the first side frame 11 and the second side frame 12 by welding.

<1.2 Characteristic Configuration of Side Frames>

As described above, the first side frame 11 and the second side frame 12 are symmetrically shaped. A description of a characteristic configuration will be given below by using the first side frame 11 as an example.

Figure 3:
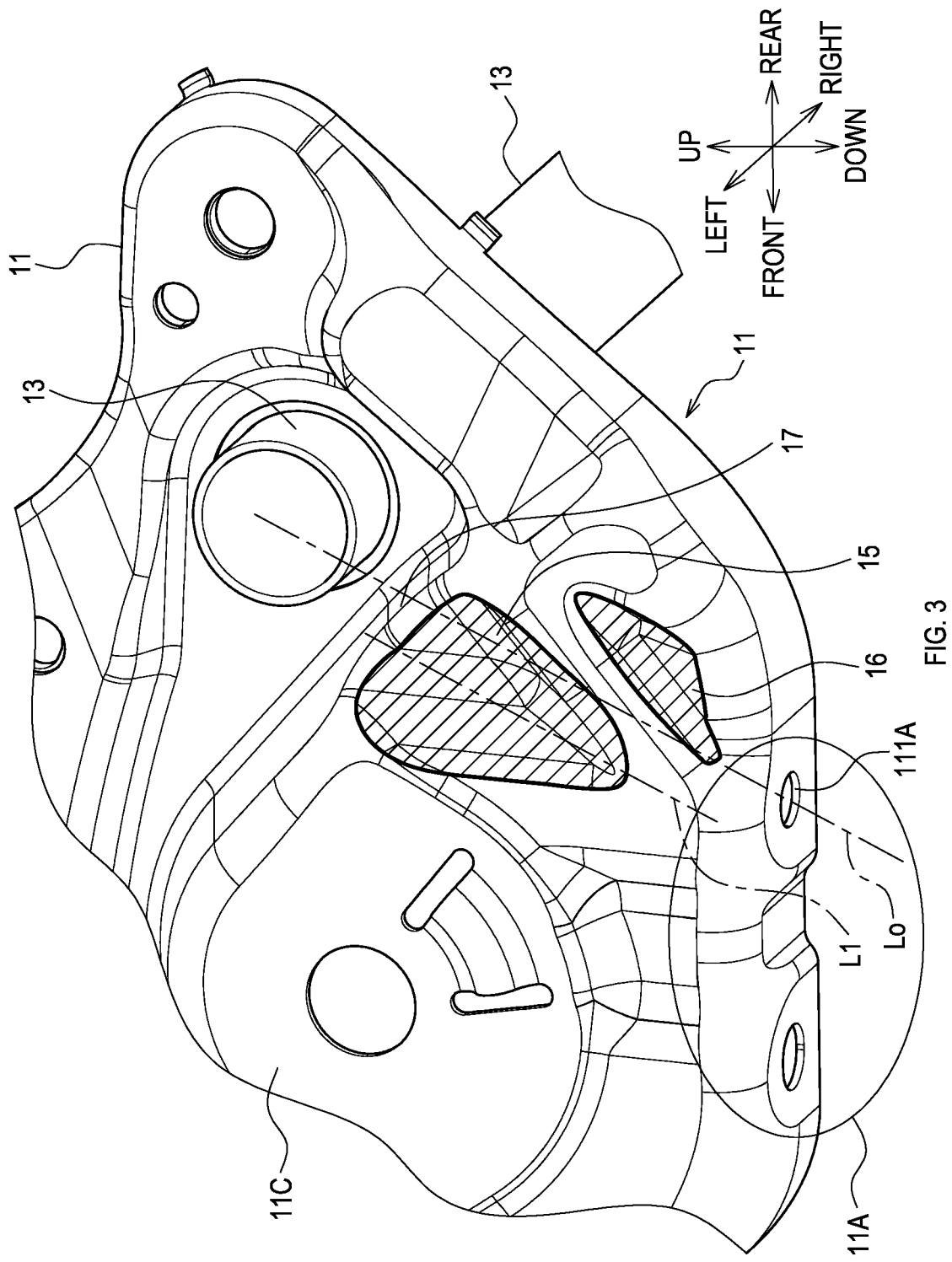
FIG. 3 is a diagram showing a rear end portion of a first side frame according to the first embodiment.
Figure 5A:
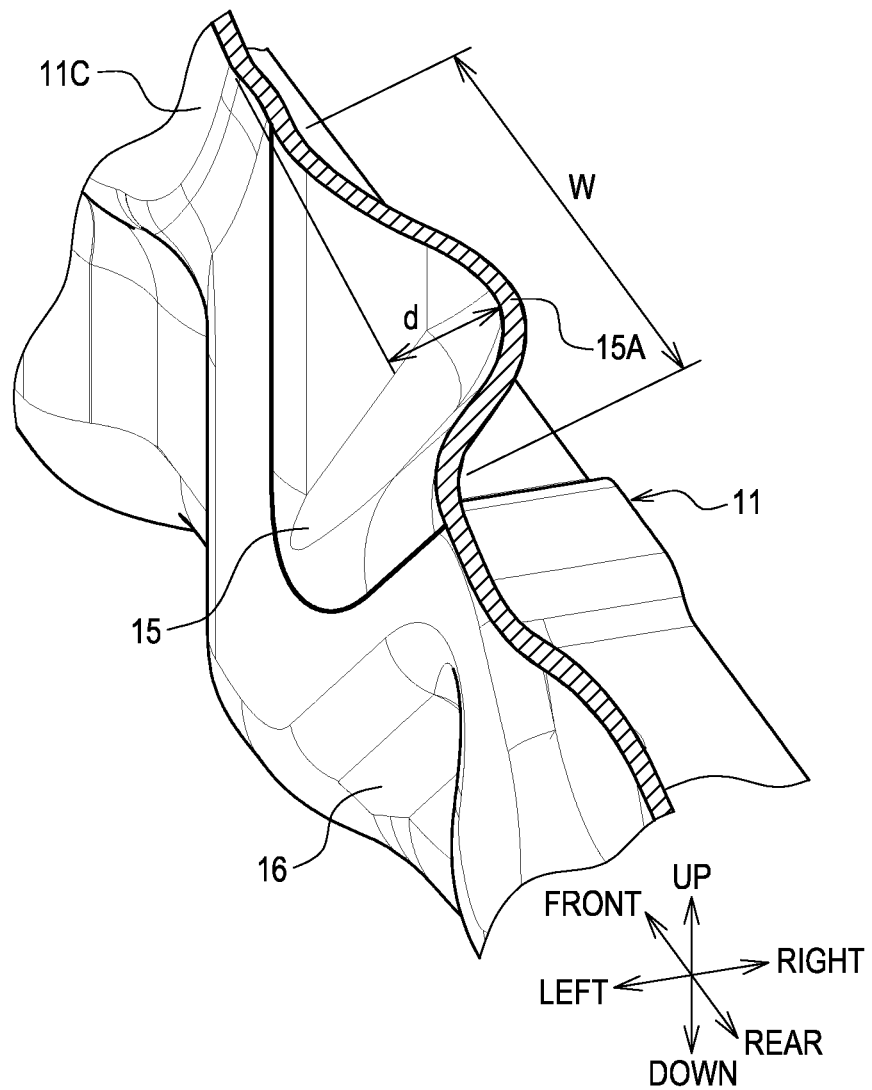
FIG. 5A is a diagram for illustrating a shape of a first bead portion.
Figure 5B:
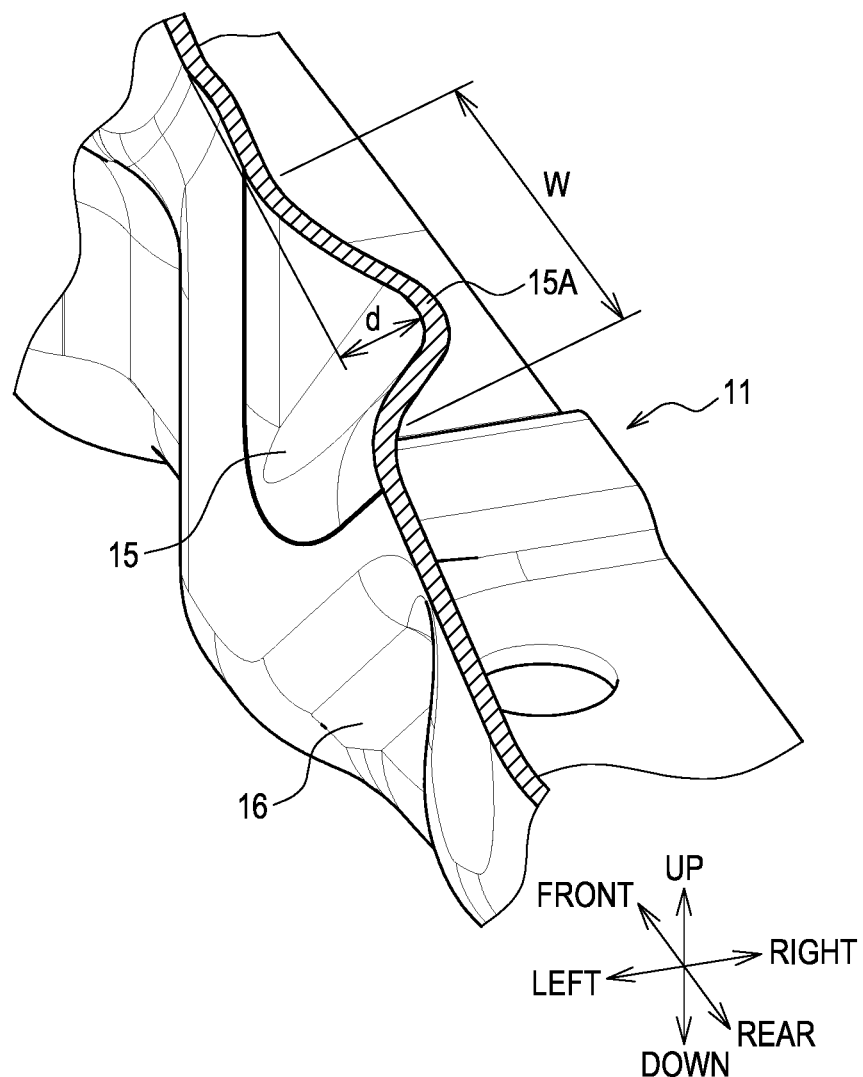
FIG. 5B is a diagram for illustrating the shape of the first bead portion.
Figure 6A:
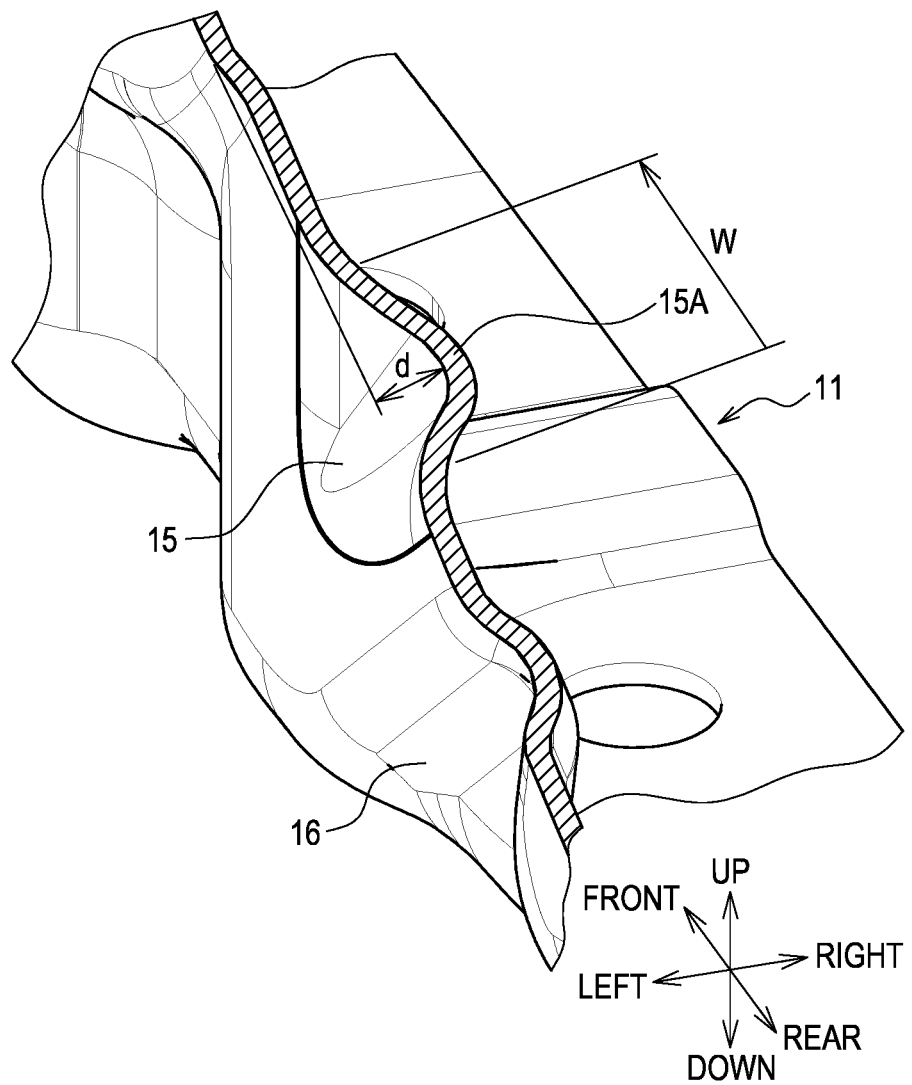
FIG. 6A is a diagram for illustrating the shape of the first bead portion.
Figure 6B:
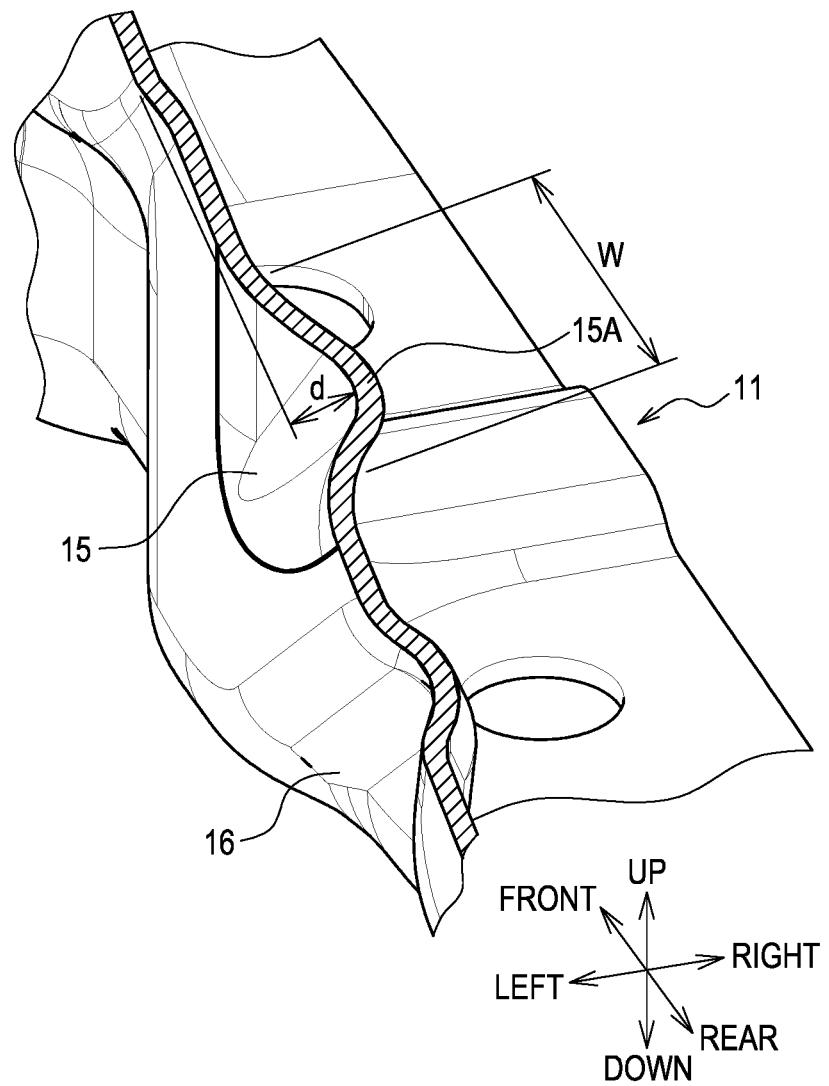
FIG. 6B is a diagram for illustrating the shape of the first bead portion.

As shown in FIG. 3, the first bead portion 15, the second bead portion 16, and a fragile portion 17 are provided in the rear end portion of the first side frame 11. Each of the first bead portion 15 and the second bead portion 16 is a portion curved such that a part of the metal plate constituting the first side frame 11 bulges or is recessed in the seat-width direction.

The first bead portion 15 and the second bead portion 16 of the first side frame 11 in the present embodiment are curved portions that are recessed relative to a general surface 11C of the first side frame 11 toward a side of the second side frame 12. The general surface 11C is orthogonal to the seat-width direction, and has a relatively small plastic flow rate of a material in the plastic working.

<Details of First Bead Portion>

As shown in FIG. 4, the first bead portion 15 is a recess in which a hypothetical ridge line L1 defined by joining tops 15A (see FIG. 5A, FIG. 5B, FIG. 6A, and FIG. 6B) of the first bead portion 15 substantially coincides with an imaginary line Lo extending from the first coupling member 13 to the rear bolt insertion hole 111A.

The imaginary line Lo shown in FIG. 4 passes from a center axis of the first coupling member 13 to a center of the rear bolt insertion hole 111A (see FIG. 3).

As shown in FIG. 5A, FIG. 5B, FIG. 6A, and FIG. 6B, the first bead portion 15 in the present embodiment has a difference in a dimension between the top 15A and the general surface 11C, that is, a recessed dimension d, varies along the ridge line L1. The recessed dimension d is a dimension parallel to the seat-width direction.

A bead width W of the first bead portion 15 decreases toward the rear bolt insertion hole 111A, that is, toward a lower end of the first bead portion 15. Accordingly, an outer edge shape of the first bead portion 15 projected onto an imaginary plane orthogonal to the seat-width direction is substantially a down-pointing triangle (see FIG. 4).

The description "the hypothetical ridge line L1 substantially coincides with the imaginary line Lo" indicates a state in which the ridge line L1 and the imaginary line Lo are substantially parallel to each other, and also a dimension of deviation between the ridge line L1 and the imaginary line Lo is, for example, less than or equal to a half of an outer diameter of the first coupling member 13.

The description "the ridge line L1 and the imaginary line Lo are substantially parallel to each other" indicates that an angle between the ridge line L1 and the imaginary line Lo is within a range of, for example, 0 degree to 15 degrees. The bead width W indicates a dimension of a portion of the first bead portion 15 parallel to a direction that is orthogonal to the ridge line L1 of the first bead portion 15 and the seat-width direction.

<Details of Second Bead Portion>

As shown in FIG. 4, the second bead portion 16 is provided below the first bead portion 15. An angle θ between the ridge line L1 and a hypothetical ridge line L2 defined by joining tops of the second bead portion 16 is equal to or less than a preset angle (for example, 30 degrees), which is 0 degree or more.

In the present embodiment, the first bead portion 15 and the second bead portion 16 are configured such that a line extending from the ridge line L1 and a line extending from the ridge line L2 cross each other in the rear bolt insertion hole 111A or in a specific region including the rear bolt insertion hole 111A.

In other words, the line extending from the ridge line L1 and the line extending from the ridge line L2 cross each other in the rear bolt insertion hole 111A or in the specific region including the rear bolt insertion hole 111A, and also the angle θ between the ridge line L1 and the ridge line L2 is equal to or smaller than "a specific angle including 0 degree".

<Details of Fragile Portion>

Figure 7:
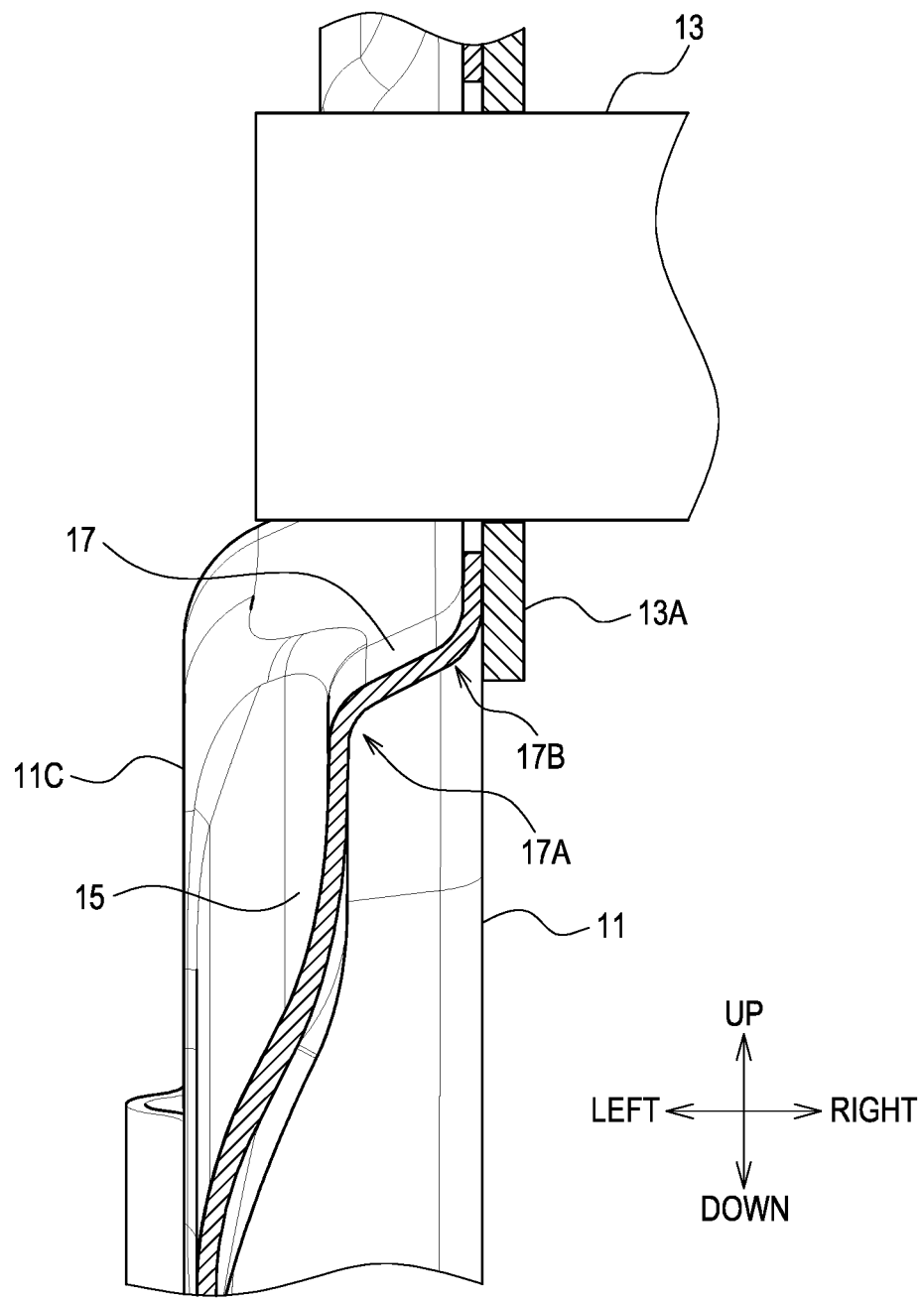
FIG. 7 is a diagram for illustrating a shape of a fragile portion.

As shown in FIG. 7, the fragile portion 17 is a step-shaped portion provided in the first side frame 11 between the first coupling member 13 and the first bead portion 15. The fragile portion 17 is more likely to cause buckling deformation due to a compression load in a direction parallel to the imaginary line Lo, compared with the other portions.

In other words, the fragile portion 17 in the present embodiment has a bent shape in a generally Z-shape in its cross section. Accordingly, if the compression load is applied such that the Z-shaped cross section is crushed, bending portions 17A, 17B that form the Z-shape are greatly deformed, thus plastically deforming such that the fragile portion 17 causes buckling.

<2. Features of Cushion Frame (especially, Side Frame) in Present Embodiment>

Each of the first side frame 11 and the second side frame 12 in the present embodiment is provided with the first bead portion 15 and the second bead portion 16. Geometrical moment of inertia is thus made large in each of the first bead portion 15 and the second bead portion 16.

Accordingly, even if a large downward load is applied to the first coupling member 13, the first side frame 11 and the second side frame 12 are inhibited from being deformed so as to bulge in the seat-width direction.

Further, this enables reduction of a thickness of a steel plate constituting the first side frame 11 and a thickness of a steel plate constituting the second side frame 12. Therefore, it is possible to reduce weights of the first side frame 11 and the second frame 12, that is, a weight of the cushion frame 10.

In addition, the fragile portions 17 each bent into a stepped shape are provided respectively between the first coupling member 13 and the first bead portion 15 of the first side frame 11 and between the first coupling member 13 and the first bead portion 15 of the second side frame 12.

Accordingly, if a large downward load is applied to the first coupling member 13, each of the fragile portions 17 can be plastically deformed so as to cause buckling, thus guiding the first coupling member 13 to be displaced along the ridge line L1 of the corresponding first bead portion 15.

Furthermore, even in a case where the large downward load is applied to the first coupling member 13 to thereby greatly displace the first coupling member 13, it is possible to inhibit the first coupling member 13 from interfering with a member other than the first side frame 11 and the second side frame 12.

OTHER EMBODIMENTS

In the aforementioned embodiment, the imaginary line Lo passes from the center axis of the first coupling member 13 through the center of the rear bolt insertion hole 111A constituting the fixation portion 11A. However, the present disclosure is not limited thereto. That is, it is sufficient that the imaginary line Lo in the present disclosure is an imaginary line extending from the first coupling member 13 to the fixation portion 11A or the rear bolt insertion hole 111A.

In the aforementioned embodiment, the fragile portion 17 is provided between the first coupling member 13 and the first bead portion 15, but the present disclosure is not limited thereto. That is, the present disclosure may include a configuration, for example, where the fragile portion 17 is not included.

The outer edge shape of the first bead portion 15 in the aforementioned embodiment is shaped as a substantially down-pointing triangle, but the present disclosure is not limited thereto. That is, the present disclosure may include the first bead portion 15 having, for example, an elliptical shape of the outer edge with its major axis coinciding with the imaginary line L1.

The first bead portion 15 and the second bead portion 16 in the aforementioned embodiment are each shaped as a recess providing a bulge toward the center in the seat-width direction, but the present disclosure is not limited thereto.

That is, the present disclosure may include, for example, the first bead portion 15 and the second bead portion 16 that provide bulges as opposed to the direction in the aforementioned embodiment, or bulges in directions different from each other.

In the aforementioned embodiment, each of the first side frame 11 and the second side frame 12 is provided with the first bead portion 15 and the second bead portion 16, but the present disclosure is not limited thereto.

That is, the present disclosure may include, for example, the first bead portion 15 and the second bead portion 16 that are provided on either the first side frame 11 or the second side frame 12.

In the aforementioned embodiments, the vehicle seat according to the present disclosure is applied to an automobile. The present disclosure is not limited to this, but may be applied to a seat for use in any vehicles, such as railroad vehicles, ships and boats, and aircrafts, and to a stationary seat for use in theaters or households.

Further, the present disclosure is not limited to the aforementioned embodiments, but may be embodied in various forms within the scope of the invention defined by the appended claims. Accordingly, the present disclosure may include a configuration that is a combination of at least two of the aforementioned embodiments, or may be configured without one or more of the components illustrated in the drawings or described with reference numerals in the aforementioned embodiments.

What is claimed is:

1. A cushion frame constituting a framework of a seat cushion of a vehicle seat, the cushion frame comprising:
    a first side frame that is arranged on one end side in a seat-width direction and that extends in seat front-rear directions, the first side frame comprising a fixation portion in a rear end portion of the first side frame, the fixation portion being directly or indirectly fixable to a vehicle;
    a second side frame that is arranged on the other end side in the seat-width direction and that extends in the seat front-rear directions, the second side frame comprising a fixation portion in a rear end portion of the second side frame, the fixation portion being directly or indirectly fixable to the vehicle; and
    a coupling member extending in the seat-width direction and coupling the rear end portion of the first side frame and the rear end portion of the second side frame, wherein
    the first side frame is provided with a first bead portion and a second bead portion in the rear end portion of the first side frame, each of the first bead portion and the second bead portion being a portion curved such that a part of the first side frame bulges or is recessed in the seat-width direction, and wherein the first bead portion and the second bead portion are recessed from a surface of the first side frame in the seat-width direction toward the second side frame,
    a first hypothetical ridge line, defined by joining top portions relative to the surface of the first side frame of the first bead portion, substantially coincides with an imaginary line extending from the coupling member to the fixation portion of the first side frame, and
    the second bead portion is positioned below the first bead portion, and an angle between a second hypothetical ridge line, defined by joining top portions relative to the surface of the first side frame of the second bead portion, and the first hypothetical ridge line of the first bead portion is equal to or less than a preset angle.

2. The cushion frame according to claim 1, wherein the first side frame is provided with a fragile portion bent into a stepped shape between the coupling member and the first bead portion.

3. The cushion frame according to claim 1, wherein
    when a dimension of a portion of the first bead portion parallel to a direction that is orthogonal to the first hypothetical ridge line of the first bead portion and the seat-width direction is defined as a bead width, the bead width of the first bead portion decreases toward the fixation portion of the first side frame.

4. The cushion frame according to claim 3, wherein
    the second side frame is provided with a first bead portion and a second bead portion in the rear end portion of the second side frame, each of the first bead portion and the second bead portion of the second side frame being a portion curved such that a part of the second side frame bulges or is recessed in the seat-width direction, and the first bead portion and the second bead portion of the second side frame are plane-symmetrical about a center in the seat-width direction with respect to the first bead portion and the second bead portion of the first side frame.

5. The cushion frame according to claim 2, wherein
    when a dimension of a portion of the first bead portion parallel to a direction that is orthogonal to the first hypothetical ridge line of the first bead portion and the seat-width direction is defined as a bead width, the bead width of the first bead portion decreases toward the fixation portion of the first side frame.

6. The cushion frame according to claim 5, wherein
    the second side frame is provided with a first bead portion and a second bead portion in the rear end portion of the second side frame, each of the first bead portion and the second bead portion of the second side frame being a portion curved such that a part of the second side frame bulges or is recessed in the seat-width direction, and
    the first bead portion and the second bead portion of the second side frame are plane-symmetrical about a center in the seat-width direction with respect to the first bead portion and the second bead portion of the first side frame.

* * * * *